US012508291B2

United States Patent
Gao et al.

(10) Patent No.: US 12,508,291 B2
(45) Date of Patent: Dec. 30, 2025

(54) ANTITUMOR VIRUS

(71) Applicant: Shanxi Academy of Advanced Research and Innovation, Shanxi (CN)

(72) Inventors: Shan Gao, Shanxi (CN); Yingzi Cui, Shanxi (CN); Zhou Tong, Shanxi (CN); Fu Gao, Shanxi (CN)

(73) Assignee: SHANXI ACADEMY OF ADVANCED RESEARCH AND INNOVATION, Shanxi (CN)

( * ) Notice: Subject to any disclaimer, the term of this patent is extended or adjusted under 35 U.S.C. 154(b) by 710 days.

(21) Appl. No.: 17/794,217

(22) PCT Filed: Jan. 20, 2021

(86) PCT No.: PCT/CN2021/072775
§ 371 (c)(1),
(2) Date: Jul. 20, 2022

(87) PCT Pub. No.: WO2021/147874
PCT Pub. Date: Jul. 29, 2021

(65) Prior Publication Data
US 2023/0057747 A1    Feb. 23, 2023

(30) Foreign Application Priority Data

Jan. 20, 2020  (CN) .......................... 202010065206.8

(51) Int. Cl.
| | | |
|---|---|---|
| *A61K 35/768* | (2015.01) | |
| *A61K 45/06* | (2006.01) | |
| *A61P 1/00* | (2006.01) | |
| *A61P 11/00* | (2006.01) | |
| *A61P 35/00* | (2006.01) | |
| *C12N 7/00* | (2006.01) | |
| *C12N 15/86* | (2006.01) | |

(52) U.S. Cl.
CPC ............ *A61K 35/768* (2013.01); *A61K 45/06* (2013.01); *A61P 1/00* (2018.01); *A61P 11/00* (2018.01); *A61P 35/00* (2018.01); *C12N 7/00* (2013.01); *C12N 2770/32333* (2013.01); *C12N 2770/32343* (2013.01); *C12N 2770/32371* (2013.01)

(58) Field of Classification Search
CPC ...... A61K 35/768; A61K 45/06; A61K 35/76; A61K 48/005; A61P 1/00; A61P 11/00; A61P 35/00; C12N 7/00; C12N 2770/32333; C12N 2770/32343; C12N 2770/32371; C12N 2770/32321; C12N 15/86; C12N 2770/32332; Y02A 50/30
See application file for complete search history.

(56) References Cited

U.S. PATENT DOCUMENTS

| | | | |
|---|---|---|---|
| 2008/0057036 A1 | 3/2008 | Johansson et al. | |
| 2009/0192109 A1* | 7/2009 | Niehrs et al. | ................... 514/44 |
| 2020/0352993 A1 | 11/2020 | Chumakov et al. | |

FOREIGN PATENT DOCUMENTS

| | | | |
|---|---|---|---|
| CN | 101027394 A | 8/2007 | |
| CN | 101065144 A | 10/2007 | |
| CN | 109536460 A | 3/2019 | |
| WO | WO 0137866 A1 * | 5/2001 | ............ A61K 39/12 |
| WO | WO 2018/066999 A2 | 4/2018 | |

OTHER PUBLICATIONS

Cui Y, Peng R, Song H, Tong Z, Qu X, Liu S, Zhao X, Chai Y, Wang P, Gao GF, Qi J. Molecular basis of Coxsackievirus A10 entry using the two-in-one attachment and uncoating receptor KRM1. Proc Natl Acad Sci U S A. Aug. 4, 2020;117(31):18711-18718.
English Translation International Search Report issued in International Application No. PCT/CN2021/072775, dated Apr. 29, 2021.
Staring J, van den Hengel LG, Raaben M, Blomen VA, Carette JE, Brummelkamp TR. KREMEN1 Is a Host Entry Receptor for a Major Group of Enteroviruses. Cell Host Microbe. May 9, 2018;23(5):636-643.
Zhao Y, Zhou D, Ni T, Karia D, Kotecha A, Wang X, Rao Z, Jones EY, Fry EE, Ren J, Stuart DI. Hand-foot-and-mouth disease virus receptor KREMEN1 binds the canyon of Coxsackie Virus A10. Nat Commun. Jan. 7, 2020:11(1):38.
Bradley, S. et al., "Applications of coxsackievirus A2I in oncology," *Oncolytic Virotherapy*, 3 (2014): 47-55.
Extended European Search Report issued in European Patent Application No. 21743917.3, dated Mar. 12, 2024.
McPhail, J. A. et al., "Characterization of the c10orf76-P14KB complex and its necessity for Golgi P14P levels and enterovirus replication," *EMBO reports*, 21 (2019): e48441, 1-17.
English Translation of an Office Action issued in Japanese Patent Application No. 2022-569290, dated Jul. 5, 2023.
Liu, Q. et al., "Construction and characterization of an infectious cDNA clone of coxsackievirus A 10," *Virology Journal*, 19.98 (2019): 1-10.
Wang, M. et al., "The Establishment of Infectious Clone and Single Round Infectious Particles for Coxsackievirus A10," *Virologica Sinica*, 35 (2020): 426-435.

* cited by examiner

*Primary Examiner* — Satyendra K Singh
(74) *Attorney, Agent, or Firm* — pH IP Law (57) ABSTRACT

Disclosed is a virus inhibiting Wnt signaling and a method for Wnt signaling using the virus. Also disclosed is a method for treating tumors using the virus.

10 Claims, 11 Drawing Sheets

Specification includes a Sequence Listing.

SEQUENCE LISTING

```
<160> NUMBER OF SEQ ID NOS: 1

<210> SEQ ID NO 1
<211> LENGTH: 1239
<212> TYPE: DNA
<213> ORGANISM: Artificial Sequence
<220> FEATURE:
<223> OTHER INFORMATION: Recombinant KRM1 extracellular domain coding
      sequence

<400> SEQUENCE: 1
aagcttgcca ccatgggcat tctgcccagc cccggcatgc ccgctctgct gtctctggtg     60
tctctgctga gcgtgctgct gatgggctgc gtggctgaga ccggagctcc ttcccccgga    120
ctgggacccg gacccgagtg ctttaccgcc aacggcgccg actacagagg aacacagaat    180
tggaccgctc tgcaaggagg aaagccttgt ctgttctgga acgagacatt ccaacacccc    240
tacaacaccc tcaagtaccc caacggagag ggaggactgg gagaacacaa ctactgcaga    300
aaccccgacg gcgatgtgag cccttggtgc tacgtcgccg aacacgagga cggagtctac    360
tggaagtact gcgaaatccc cgcttgccaa atgcccggca atctgggctg ctacaaggat    420
cacggaaacc cccctcccct caccggcacc tccaagacct ccaacaagct caccatccag    480
acatgcatca gcttctgcag atcccagagg tttaagttcg ccggcatgga gtccggctat    540
gcttgcttct gcggcaacaa ccccgactat tggaagtacg gcgaagctgc cagcaccgag    600
```

```
tgcaattccg tgtgcttcgg cgatcacacc cagccttgcg gaggagacgg aagaatcatt      660
ctgtttgaca cactggtggg cgcttgcggc ggaaactact ccgccatgag cagcgtggtg      720
tacagccccg acttccccga cacctacgcc accggcagag tgtgttactg gaccattaga      780
gtgcccggcg ccagccacat ccactttagc ttccctctgt tcgacattag agatagcgct      840
gacatggtcg agctgctgga tggatacacc catagggtgc tggctagatt ccacggaagg      900
agcagacctc ctctgtcctt caacgtctct ctggacttcg tgattctgta cttcttcagc      960
gatagaatca accaagccca aggcttcgcc gtcctctatc aagccgtgaa agaggagggc     1020
agcgagaacc tctactttca aggcggatct ctgccccaag agagacccgc cgtcaaccaa     1080
acagtggccg aggtgattac agagcaagcc aatctgagcg tgtccgctgc tagaagctcc     1140
aaggtgctgt atgtgatcac cacctcccct agccatcccc cccagacagt gcccggcaca     1200
caccaccacc accatcacca ccatcatcac tgaggatcc                            1239
```

ANTITUMOR VIRUS

CROSS-REFERENCE TO RELATED APPLICATIONS

This application is a national phase application under 35 U.S.C. § 371 of International Application No. PCT/CN2021/072775, filed Jan. 20, 2021, the entire contents of which are hereby incorporated by reference; and which claims the priority of Chinese Patent Application No. 202010065206.8 filed with the China National Intellectual Property Administration on Jan. 20, 2020, which is hereby incorporated by reference in entirety.

This application claims the priority of Chinese Patent Application No. 202010065206.8 filed with the China National Intellectual Property Administration on Jan. 20, 2020, which is hereby incorporated by reference in entirety.

Pursuant to 37 C.F.R. 1.821 (c), a sequence listing is submitted herewith as an ASCII compliant text file named "UNITP0083US_ST25.txt", created on Jul. 19, 2022 and having a size of ~1.95 kilobytes. The content of the aforementioned file is hereby incorporated by reference in its entirety.

FIELD

The present disclosure relates to a virus that inhibits Wnt signaling and a method for inhibiting Wnt signaling using the virus, and also relates to a method for treating tumors using the virus.

BACKGROUND

Hand-foot-mouth disease (HFMD) is an infectious disease that occurs mostly in children under the age of 5 and is rare in adults. Routes of infection include gastrointestinal, respiratory and contact transmission. HFMD has an incubation period of 2-10 days, with an average of 3-5 days. Symptoms include mouth pain, anorexia, low-grade fever, small herpes or small ulcers on hands, feet, and mouth. HFMD is self-healing for most children within a week. It may cause complications such as myocarditis, pulmonary edema and aseptic meningoencephalitis in a few children. Some severe cases develop rapidly and lead to death. There is no effective therapeutic drugs yet, mainly symptomatic treatment.

A variety of enteroviruses can cause HFMD. The most common pathogens are coxsackievirus A16 (CV-A16, also known as CVA16) and enterovirus 71 (EV-A71, also known as EV-71 or EV71), both of which belong to the genus Enterovirus in the Picornaviridae family.

Coxsackieviruses are divided into two categories: A (23 types) and B (6 types). Although CV-A16 is an important causative agent of HFMD, 90% of coxsackievirus infections cause no symptoms or only fever.

To date, the understanding of these enteroviruses is still limited, so it is necessary to further study the pathogenic spectrum and pathogenesis of enteroviruses.

SUMMARY

In the study of the enteroviruses pathogenic spectrum using Coxsackievirus A10 (CV-A10, also known as CVA10) as a model, the inventors unexpectedly found that enteroviruses such as CV-A10 can inhibit the growth of tumor cells in vitro. The inventors then further confirmed that CV-A10 has in vivo antitumor activity in mouse model.

In order to study the pathogenic mechanism of enteroviruses such as CV-A10 and the possible antitumor mechanism, the inventors investigated the structure of the complex comprising CV-A10 and Kremen 1 (KRM1) by using cryo-electron microscopy. In this study, the inventors also unexpectedly found that the binding site of CV-A10 and KRM1 greatly overlaps with the binding site of DKK1 (Dickkopf-related protein 1) and KRM1. The inventors subsequently confirmed this overlap between the binding sites in experiments. On the basis of the above findings, the inventors have completed the present disclosure.

In one aspect, a method for inhibiting Wnt signaling pathway in a cell is provided, comprising exposing the cell to an enterovirus using KRM1 on the cell as a receptor, for example, the virus is selected from the group consisting of CV-A2, CV-A3, CV-A4, CV-A5, CV-A6, CV-A10 and CV-A12, particularly CV-A10.

Without being limited to any theory, the term "enterovirus using KRM1 as a receptor" described herein refers to an enterovirus which binds to KRM1 on the cell surface and completes the process of virus invasion into host cells through membrane, wherein KRM1 serves as a viral receptor. For example, coxsackieviruses CV-A2, CV-A3, CV-A4, CV-A5, CV-A6, CV-A10 and CV-A12 are mediated by KRM1 for viral invasion and subsequent processes, and they are all enteroviruses using KRM1 on the cell surface as a viral receptor described herein (Jacqueline Staring etc. KREMEN1 Is a Host Entry Receptor for a Major Group of Enteroviruses, 2018, Cell Host & Microbe 23, 636-643).

In a second aspect, a method for degrading β-catenin in a cell is provided, comprising exposing the cell to an enterovirus using KRM1 as a receptor, for example, the virus is selected from the group consisting of CV-A2, CV-A3, CV-A4, CV-A5, CV-A6, CV-A10 and CV-A12, particularly CV-A10.

In one embodiment, the virus is engineered. For example, an engineered virus contains an additional protein and/or a coding sequence thereof and/or a nucleic acid such as a non-coding RNA, which contribute to the purpose of the present invention.

In a third aspect, a method for inhibiting the growth of a tumor cell is provided, comprising exposing the tumor cell to an enterovirus using KRM1 as a receptor, for example, the virus is selected from the group consisting of CV-A2, CV-A3, CV-A4, CV-A5, CV-A6, CV-A10 and CV-A12, particularly CV-A10.

In one embodiment, the tumor cell is, for example, a cell derived from the following tumors: colon cancer, melanoma, prostate cancer, lung cancer such as non-small cell lung cancer, liver cancer, hepatocellular carcinoma, cervical cancer, uterine cancer, pancreatic cancer, gastric cancer, esophageal carcinoma, brain cancer, nail matrix cell cancer and breast cancer.

In another embodiment, the virus is engineered. For example, an engineered virus contains or capable of producing an additional protein and/or a coding sequence thereof and/or a non-coding nucleic acid such as a non-coding RNA, which contribute to the purpose of the present invention. For example, in this aspect, the expression "contribute to the purpose" herein means to help to inhibit the growth of tumor cells. For example, the genome of the engineered virus further comprises a nucleotide sequence encoding an additional anti-tumor agent or tumor therapeutic agent.

In a fourth aspect, a method for treating a tumor is provided, comprising administering an enterovirus using KRM1 as a receptor to a subject in need thereof, for example, the virus is selected from the group consisting of CV-A2, CV-A3, CV-A4, CV-A5, CV-A6, CV-A10 and CV-A12, such as CV-A10.

In one embodiment, the tumor is selected from the group consisting of colon cancer, melanoma, prostate cancer, lung cancer such as non-small cell lung cancer, liver cancer, hepatocellular carcinoma, cervical cancer, uterine cancer, pancreatic cancer, gastric cancer, esophageal carcinoma, brain cancer, nail matrix cell cancer and breast cancer.

In another embodiment, the virus is engineered. For example, the engineering can be any engineering which contributes to the purpose of the present invention. For example, in this aspect, the expression "contribute to the purpose" herein refers to a contribution to the treatment of a tumor, such as to virus preservation/transportation, to administering virus, and to achieving better antiviral treatment effect. For example, an engineered virus may contain or capable of producing an additional protein, a nucleic acid and/or a coding sequence thereof, which contribute to its purpose, wherein the nucleic acid is, for example, a non-coding nucleic acid, such as non-coding RNA. It is easy to understand that the term "engineering" herein may also include other engineering modifications performed to achieve other purposes.

In a specific embodiment, the genome of the engineered virus further comprises a nucleotide sequence encoding an additional tumor therapeutic agent. The additional tumor therapeutic agent, for example, may be a protein and/or nucleic acid such as non-coding RNA for treating a tumor.

In another embodiment, the virus is administered to the subject by intratumoral injection, paracancerous injection, intravenous injection and/or intramuscular injection. For example, the virus is administered by intratumoral injection, the virus is administered by paracancerous injection, the virus is administered by intravenous injection, the virus is administered by intramuscular injection, the virus is administered by intratumoral injection and/or paracancerous injection, the virus is administered by intratumoral injection and/or intravenous injection, and the virus is administered by intratumoral injection, paracancerous injection and/or intravenous injection. Intratumoral injection is a typical route of administration for antitumor viruses, whereby the virus can enter the treatment site directly without going through the circulatory system. However, intratumoral injection often requires an experienced professional to perform.

Paracancerous injection is easier to perform and is usually competently performed by a professional with initial training. By paracancerous injection, the therapeutic agent generally enters the treatment site slightly slower than intratumoral injection, making paracancerous injection less preferred than intratumoral injection. In practice, however, the operation intended to inject intratumorally is likely to inject adjacent to the tumor. Intravenous injection is a procedure that is mastered by almost all medical professionals and requires no additional training. By intravenous injection, the therapeutic agent is carried to the treatment site by the circulatory system, and the therapeutic agent will also be diluted in the circulatory system. Therefore, compared to intratumoral and paracancerous injections, intravenous injection is generally less preferred in antitumor viral therapy. The inventors unexpectedly found that in the use of the enterovirus herein for antitumor therapy, intravenous injection has almost the equivalent antitumor effect as intratumoral injection. Intramuscular injection has relatively lower requirements for auxiliary conditions, by which the therapeutic agent needs to be absorbed locally before entering the circulatory system, and then enters the site to be treated by the circulatory system.

In another embodiment, the virus is administered by a digestive tract route, e.g., orally. It is well known that the digestive tract route is not the usual choice for anti-tumor viral therapy. The inventors unexpectedly found that even if the virus is administered by the digestive tract route, a significant antitumor effect is still achieved.

In another embodiment, the method further comprises administering to the subject an additional anti-tumor therapy. The additional anti-tumor therapy is, for example, selected from the group consisting of chemotherapy, radiotherapy, targeted therapy, immunotherapy and a combination thereof.

It should be pointed out that in spite of enteroviruses are considered as pathogens, HFMD is mainly caused by CV-A16 and EV-A71, and is more common in children under 5 years old. Most of the children have mild symptoms, and significant symptoms are rarely seen in older children and adults. Based on the unexpected findings of the present disclosure, this broad safety profile makes the enteroviruse using KRM1 as a receptor particularly suitable for the treatment of tumors, particularly those found in older children (greater than 5 years of age) and adults. Thus, in a specific embodiment, the subject of treatment is an older child or adult.

In a fifth aspect, an enterovirus using KRM1 as a receptor is provided, which is used in the inhibition of Wnt pathway signaling in a cell, the degradation of β-catenin in a cell, the inhibition of the growth of a tumor cell such as a colon cancer cell, or the treatment of a tumor such as colon cancer, for example, the virus is selected from the group consisting of CV-A2, CV-A3, CV-A4, CV-A5, CV-A6, CV-A10 and CV-A12, particularly CV-A10.

In one embodiment, the virus is engineered. For example, the engineering can be any genetic engineering which contributes to the purpose of the present invention. For example, in this aspect, the term "contributes to the purpose" herein refers to a contribution to the treatment of a tumor, such as to virus preservation/transportation, to administering virus, and to achieving better antiviral treatment effect. For example, an engineered virus also contains or is capable of producing an additional protein, a nucleic acid and/or a coding sequence thereof, which contribute to its purpose, wherein the nucleic acid is, for example, a non-coding nucleic acid, such as non-coding RNA. It is easy to understand that the term "engineering" herein may also include genetic engineering performed to achieve other purposes.

In a specific embodiment, the genome of the engineered virus further comprises a nucleotide sequence encoding an additional tumor therapeutic agent. The additional tumor therapeutic agent, for example, may be a protein and/or nucleic acid such as non-coding RNA for treating a tumor.

In another embodiment, the virus is administered to the subject by intratumoral injection, paracancerous injection, intravenous injection and/or intramuscular injection. For example, the virus is administered by intratumoral injection, the virus is administered by paracancerous injection, the virus is administered by intravenous injection, the virus is administered by intramuscular injection, the virus is administered by intratumoral injection and/or paracancerous injection, the virus is administered by intratumoral injection and/or intravenous injection, and the virus is administered by intratumoral injection, paracancerous injection and/or intravenous injection. Intratumoral injection is a typical route of administration for antitumor viruses, whereby the virus can enter the treatment site directly without passing through the circulatory system. However, intratumoral injection often requires an experienced professional to perform. Paracancerous injection is easier to perform and is usually competently performed by a professional with initial training. By paracancerous injection, the therapeutic agent generally enters the treatment site slightly slower than intratumoral injection, making paracancerous injection less preferred than intratumoral injection. In practice, however, the operation intended to inject intratumorally is likely to inject adjacent to the tumor. Intravenous injection is a procedure that is mastered by almost all medical professionals and requires no additional training. In intravenous injection, the therapeutic agent is carried into the treatment site by the circulatory system, and the therapeutic agent will also be diluted in the circulatory system. Therefore, compared to intratumoral and paracancerous injections, intravenous injection is generally less preferred in antitumor viral therapy. The inventors unexpectedly found that in the use of the enterovirus herein for antitumor therapy, intravenous injection has almost the equivalent antitumor effect to intratumoral injection. Intramuscular injection has relatively lower requirements for auxiliary conditions, by which the therapeutic agent needs to be absorbed locally before entering the circulatory system, and then enters the site to be treated by the circulatory system.

In another embodiment, the virus is administered by a digestive tract route, e.g., orally. It is well known that the digestive tract route is not the usual choice for anti-tumor viral therapy. The inventors unexpectedly found that even if the virus is administered by the digestive tract route, a significant antitumor effect is still achieved.

In a sixth aspect a pharmaceutical composition comprising the enterovirus described in the sixth aspect is provided, which is used to inhibit Wnt pathway signaling in a cell, to degrade β-catenin in a cell, to inhibit the growth of a tumor cell such as a colon cancer cell, or to treat a tumor such as colon cancer, for example, the virus is selected from the group consisting of CV-A2, CV-A3, CV-A4, CV-A5, CV-A6, CV-A10 and CV-A12, particularly CV-A10.

DETAILED DESCRIPTION

Definitions

Unless otherwise specified, terms used herein have the meanings commonly understood by those skilled in the art. Definitions of some terms used herein are provided below, and in the event of other interpretations of these terms, the definitions given herein shall prevail.

As used herein, the term "virus", such as "enterovirus", includes wild-type virus strains isolated directly from the environment or from diseased individuals, as well as various virus variants derived from such wild-type viruses. On the other hand, in addition to viral particles produced by conventional infection, the term "virus" also includes viral particles and virus-like particles (VLPs) produced by human intervention in one or more processes of viral replication, assembly, and the like.

The term "engineered virus" as used herein refers to a virus or a variant thereof, different from a wild-type virus, which has been genetically engineered for the purposes described herein or for other purposes.

As used herein, the term "treat", "treating" or "treatment" refers to any procedure that is beneficial to the health condition of the target subject, such as preventing the occurrence of disease, reducing the risk of developing disease, slowing or impeding the progression of disease, inhibiting or arresting the growth of disease-related cells or entities (such as tumor cells or tumors entities), killing disease-related cells (such as tumor cells), shrinking disease-related entities (such as tumor entities), reducing or eliminating disease-related symptoms, preventing or slowing the occurrence or development of disease-related complications, inhibiting or slowing metastasis of disease, and improving the survival rate of a diseased subject.

The term "anti-tumor therapy" as used herein refers to any treatment that contributes to preventing or delaying the occurrence of tumor, reducing the risk of developing tumor, slowing or impeding the progression of tumor, inhibiting or arresting the growth of tumor cells or tumors entities, killing tumor cells, arresting the growth of or shrinking tumor entities, reducing or eliminating tumor-related symptoms (such as tumor pain), preventing or slowing the occurrence or development of tumor-related complications, inhibiting or slowing tumor metastasis, or improving the survival rate of a diseased subject. Anti-tumor therapy can be, for example, one or more of surgical resection, chemotherapy, radiotherapy, targeted therapy, and immunotherapy. In medical practice, in order to alleviate or eliminate the unhealthy state of a diseased subject, medical professionals often select one or more applicable tumor treatments.

The terms "Wnt pathway", "Wnt/β-catenin pathway" as used herein refer to the signaling process mediated via Wnt and its receptor. The Wnt pathway is an important pathway for intracellular signal transmission and widely involved in a variety of physiological and pathological processes. The term "inhibiting Wnt signaling pathway" refers to causing the Wnt signaling pathway that mediates a physiological process to change in the opposite direction to the physiological process, and is sometimes referred to as negatively regulating Wnt signaling pathway.

The term "selected from" as used herein refers to selecting from a plurality of candidates. When applicable, the "selected from" may be the selection of one or more candidates from a plurality of candidates, unless otherwise stated.

EXAMPLES

The embodiments of the present disclosure will be described in detail below in conjunction with the examples. Those skilled in the art will understand that the following examples are only for illustrating the present disclosure and should not be construed as limiting the scope of the present disclosure. If the specific conditions are not indicated in the examples, it is carried out according to the conventional conditions or the conditions suggested by the manufacturer. The reagents or instruments used without indicating the manufacturer are conventional products that can be purchased from the market.

Example 1: Amplification and Purification of CV-A10 Virus

Figure 1:
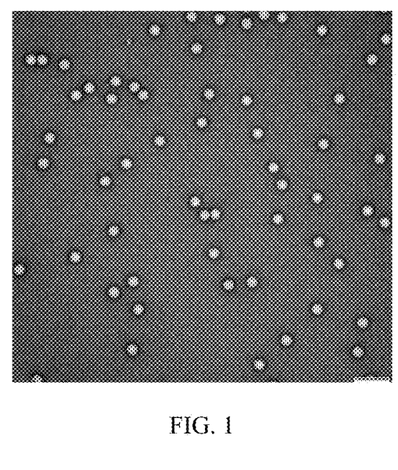
FIG. 1 shows a transmission electron microscope (TEM) image of CV-A10. Scale bar: 100 nm.

Coxsackievirus A10 (CV-A10) HB09-035 strain was isolated in Hebei Province in 2009. The virus strain was deposited in the China General Microbiological Culture Collection Center (No. 3, No. 1, West Beichen Road, Chaoyang District, Beijing, China) on Jan. 19, 2020 with an accession number of CGMCC NO. 19294. Human rhabdomyosarcoma cells (RD cells, ATCC CCL-136) were cultured in DMEM medium containing 10% fetal bovine serum. $5 \times 10^7$ cells were seeded in a 15 cm dish and incubated at 37° C., 5% $CO_2$ for 24 hours. The medium was discarded, and CV-A10 virus seed, diluted with DMEM medium, was added to the dish according to the multiplicity of infection (MOI)=0.1 and cultured for 36 hours. When 90% cytopathic effect (CPE) was observed under microscope, the supernatant was collected for concentrating the virus and cell pieces were removed by using KrosFlo® TFF systems 300 kD. Then ultracentrifugation was carried out at 140,000 g for 2 hours and the supernatant was discarded. The virus pellet was slowly resuspended in PBS (pH 7.4) and transferred into a microcentrifuge tube. The virus resuspension was centrifuged at 140,000 g for 4 hours in a 15%-45% sucrose density gradient. Each 200 μl (as one layer) was collected in separate tubes, and an equal volume of PBS was added to reduce the osmotic pressure of the solution. The samples with OD260/280 greater than 1.5 were examined by transmission electron microscope, and the samples with relatively more mature virus particles were reserved (as shown in FIG. 1). The virus was stored in PBS solution for later use, and the concentration and titer were measured.

Example 2: CV-A10 Inhibits the Growth of Human Colon Cancer RKO Cells

Figure 2:
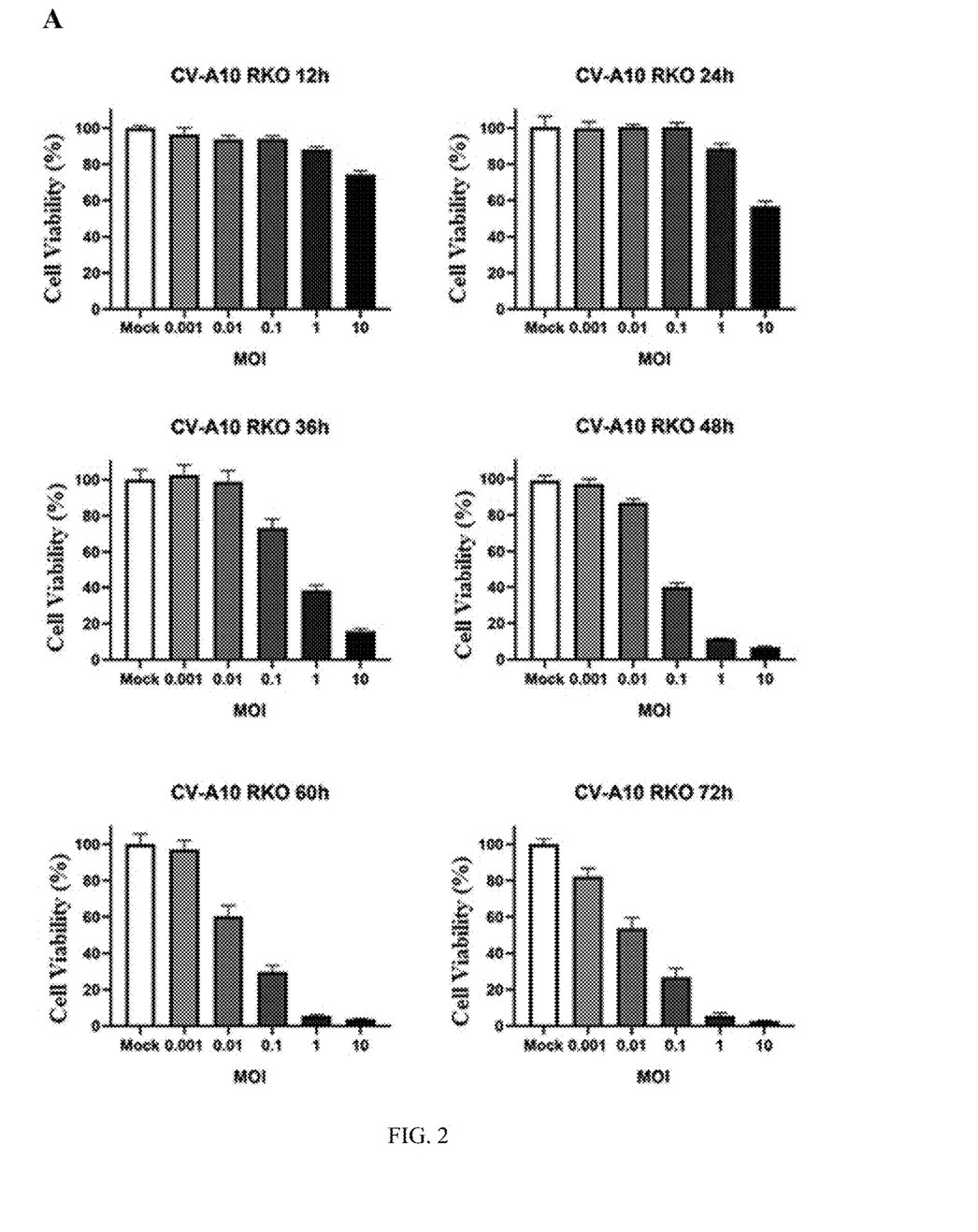
FIG. 2 shows that CV-A10 inhibited the growth of human colon cancer RKO cells in vitro, and this inhibitory effect was positively correlated with virus titer and gradually increased with time (A); EV-A71 infected RKO cells as a control (B).

The colon cancer cell line RKO (ATCC CRL-2577) was cultured, and $2 \times 10^4$ cells were transferred into a 96-well plate and cultured for 8 h. The culture medium was changed to serum-free DMEM medium. Cells were infected with virus at different titers (MOI=0.001-10) and cultured at 37° C., and cell viability was determined at different time points. Viability assay was performed using the CellTiter-Glo Luminescent Cell Viability Assay kit (Promega) according to the user manual. The results are shown in FIG. 2A. After 12 h of infection with high titer virus (MOI=10), the cell viability began to decline, and almost all cells died at 48 h. Lower titer virus (MOI=1) also caused almost all cancer cells to die after 60 h. Viruses of other titers produced gradients of inhibitory effect at different times. The virus of the lowest titer (MOI=0.001) also showed inhibition on cell growth at 72 h. These results indicated that CV-A10 inhibited the growth of colon cancer RKO cells in vitro, and the effect was positively correlated with virus titer and infection time. Experiments with EV-A71 under the same conditions showed that EV-A71 had no significant inhibitory effect on the growth of human colon cancer RKO cells until 48 h (FIG. 2B), indicating that the effect of CV-A10 was specific.

Figure 3:
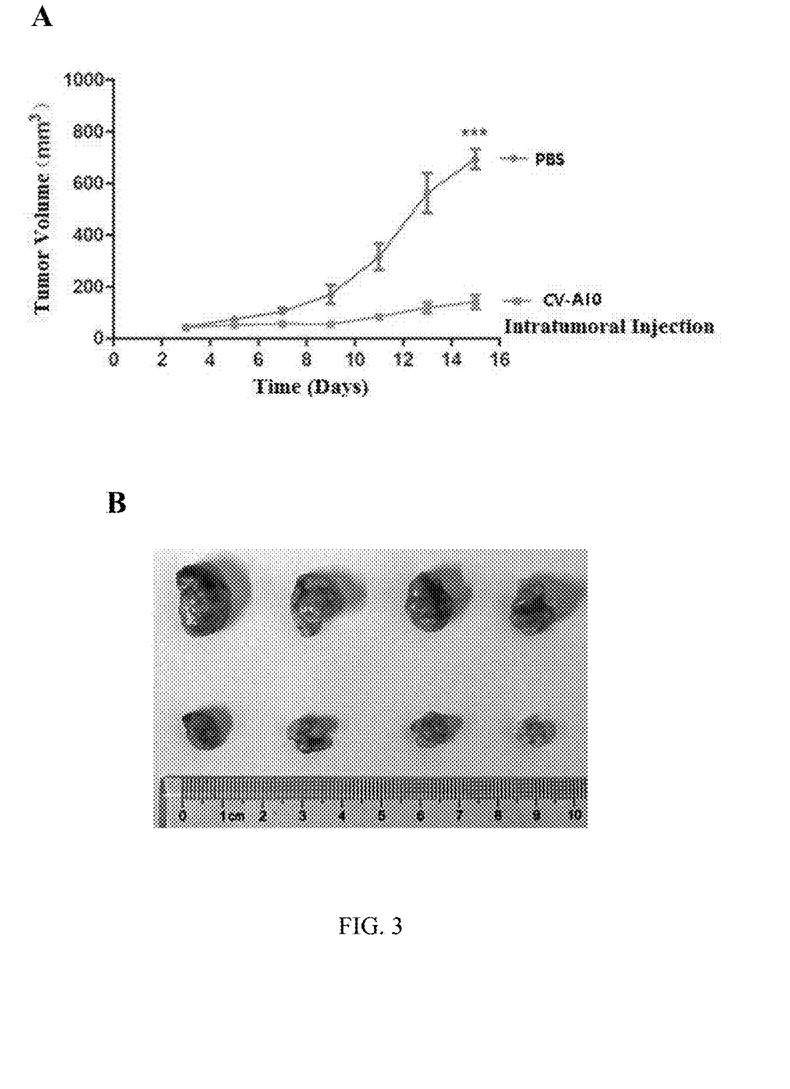
FIG. 3 shows tumor growth before and after injection of CV-A10 virus in NCG mice inoculated with colon cancer RKO cells. (A) Statistical results of intratumoral injection of CV-A10 virus, (B) schematic diagram of tumor size after intratumoral injection, (C) statistical results of intravenous injection of CV-A10 virus, and (D) schematic diagram of tumor size after intravenous injection.

Example 3: Intratumoral or Intravenous Injection of CV-A10 Inhibits Growth of Solid Tumor in Mice A total of fifteen 4-week-old NCG mice (17-19 g) were selected and injected with $5 \times 10^6$ RKO cells/mouse on the back. After inoculation, the tumor formation on the back was observed after feeding for 5 days. When the tumors grew to 120 $mm^3$, mice were treated once every 3 days, that is, intratumoral injection or intravenous injection of CV-A10 virus was performed on Day 5, 8, 11, 14, and 17. A Control groups were set up, with 5 animals in each group. Among them, mice in the intratumoral injection group were given intratumoral injection at multiple positions, and mice in the intravenous injection group were given single injection via tail vein, and the therapeutic dose was $1 \times 10^7$ virions/time. In the control group, multiple intratumoral injections of PBS were performed to exclude manipulation errors in the corresponding treatment groups. Every two days, the body weight of the mice was recorded and the long and short diameters of the tumors were measured with vernier calipers and recorded for 20 consecutive days. Mice were sacrificed 20 days after tumor cell inoculation, and tumors were removed and measured for volume. From the tumor volume data, it can be seen that the tumor sizes were significantly different on Day 11 (after 2 treatments, 6 days after treatment) in the intratumoral injection group and on Day 13 (after 3 treatments, 8 days after treatment) in the intravenous injection group. The results demonstrated that either intratumoral injection (FIGS. 3A-3B) or intravenous injection (FIGS. 3C-3D) of CV-A10 could inhibit tumor growth.

Example 4: Expression and Purification of KRM1 Receptor Protein

Figure 4:
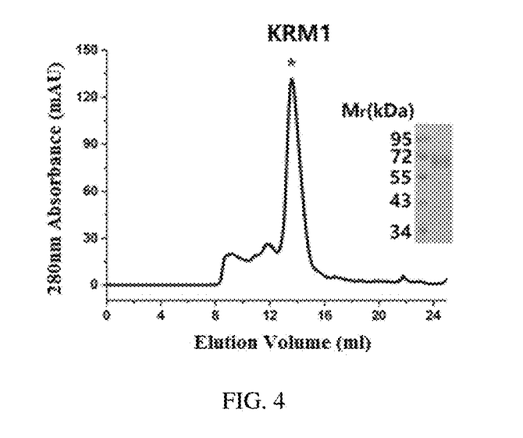
FIG. 4 shows the purification and SDS-PAGE identification of recombinant KRM1 protein.

The DNA sequence (Genbank No. AAH63787) encoding the extracellular region (amino acids 23-373) of human Kremen 1 (KRM1) was ligated into the pCMV3 vector (Beijing Sino Biological, Inc.) through restriction sites HindIII and BamHI. The sequence of KRM1 protein was added with human type II interferon signal peptide at the 5' end and the coding sequence of the 10 histidine affinity tag (His10-tag) and a stop codon at the 3' end (the inserted sequence is shown in SEQ ID NO. 1), and plasmid pCMV3-KRM1-ectodomain was obtained. $1 \times 10^7$ 293 T cells were seeded and cultured in a 15 cm cell culture dish containing 20 ml of DMEM medium. After the cells reached 70% confluence, transfection of plasmid was performed. 50 µg plasmid and 150 µl transfection reagent PEI (1 mg/ml) were prepared in buffer HBS (20 mM HEPES, 150 mM NaCl, pH 7.4). A total of 2 ml of the transfection system was mixed at room temperature for 30 min and added to the 15 cm culture dish in which 293T cells were cultured. After 6 hours of transfection, the supernatant was discarded, and the medium was changed to DMEM medium without serum and transfection reagent to culture for another 3 days. After 3 days, the culture supernatant was collected, purified by nickel ion affinity chromatography (HisTrap™ HP (GE)) and gel filtration chromatography (Superdex™ 200 increase 10/300 GL (GE)) to obtain soluble human KRM1 extracellular region protein. The protein purity was identified by SDS-PAGE (as shown in FIG. 4). After identification, a high-purity KRM1 protein with a size of about 70 kDa was obtained.

The sequence encoding the extracellular region of recombinant human KRM1 is as follows:

(SEQ ID NO. 1)
AAGCTTGCCACCATGGGCATTCTGCCCAGCCCCGGCATGCCCGCTCTGCT

GTCTCTGGTGTCTCTGCTGAGCGTGCTGCTGATGGGCTGCGTGGCTGAGA

CCGGAGCTCCTTCCCCCGGACTGGGACCCGGACCCGAGTGCTTTACCGCC

AACGGCGCCGACTACAGAGGAACACAGAATTGGACCGCTCTGCAAGGAGG

AAAGCCTTGTCTGTTCTGGAACGAGACATTCCAACACCCCTACAACACCC

TCAAGTACCCCAACGGAGAGGGAGGACTGGGAGAACACAACTACTGCAGA

AACCCCGACGGCGATGTGAGCCCTTGGTGCTACGTCGCCGAACACGAGGA

CGGAGTCTACTGGAAGTACTGCGAAATCCCCGCTTGCCAAATGCCCGGCA

ATCTGGGCTGCTACAAGGATCACGGAAACCCCCCTCCCCTCACCGGCACC

TCCAAGACCTCCAACAAGCTCACCATCCAGACATGCATCAGCTTCTGCAG

ATCCCAGAGGTTTAAGTTCGCCGGCATGGAGTCCGGCTATGCTTGCTTCT

GCGGCAACAACCCCGACTATTGGAAGTACGGCGAAGCTGCCAGCACCGAG

TGCAATTCCGTGTGCTTCGGCGATCACACCCAGCCTTGCGGAGGAGACGG

AAGAATCATTCTGTTTGACACACTGGTGGGCGCTTGCGGCGGAAACTACT

CCGCCATGAGCAGCGTGGTGTACAGCCCCGACTTCCCCGACACCTACGCC

ACCGGCAGAGTGTGTTACTGGACCATTAGAGTGCCCGGCGCCAGCCACAT

CCACTTTAGCTTCCCTCTGTTCGACATTAGAGATAGCGCTGACATGGTCG

AGCTGCTGGATGGATACACCCATAGGGTGCTGGCTAGATTCCACGGAAGG

AGCAGACCTCCTCTGTCCTTCAACGTCTCTCTGGACTTCGTGATTCTGTA

CTTCTTCAGCGATAGAATCAACCAAGCCCAAGGCTTCGCCGTCCTCTATC

AAGCCGTGAAAGAGGAGGGCAGCGAGAACCTCTACTTTCAAGGCGGATCT

CTGCCCCAAGAGAGACCCGCCGTCAACCAAACAGTGGCCGAGGTGATTAC

AGAGCAAGCCAATCTGAGCGTGTCCGCTGCTAGAAGCTCCAAGGTGCTGT

ATGTGATCACCACCTCCCCTAGCCATCCCCCCCAGACAGTGCCCGGCACA

CACCACCACCACCATCACCACCATCATCACTGAGGATCC.

Example 5: The Binding Pattern and Interaction Process of KRM1 and CV-A10 are Similar to Those of KRM1 and DKK1

Figure 5:
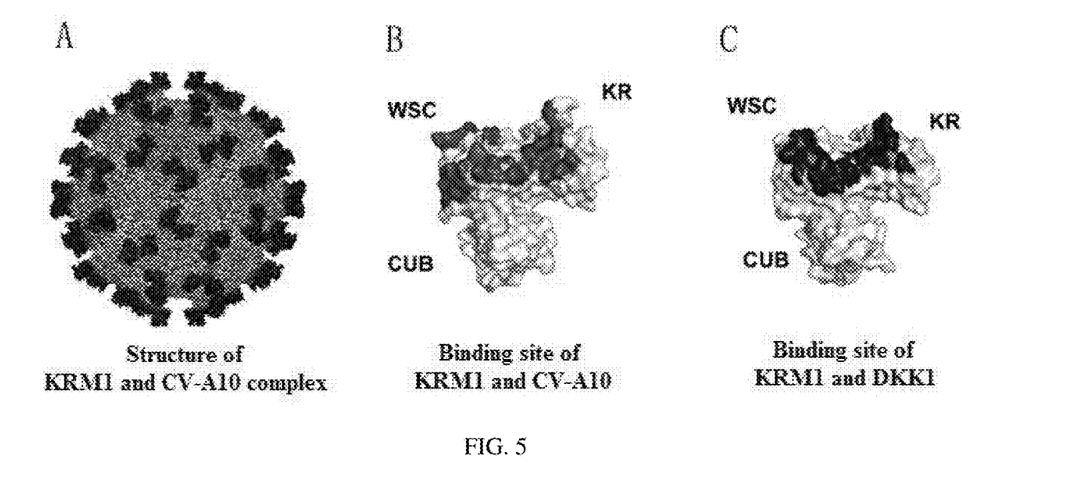
FIG. 5 shows the structure of KRM1 and CV-A10 complex (A), binding site of KRM1 and CV-A10 (B), and binding site of KRM1 and DKK1 (C).

The purified CV-A10 and the KRM1 protein in Examples 1 and 4 were incubated in vitro. The purified CV-A10 virus (2 mg/ml) was incubated with an excess of KRM1 (0.2 mg/ml) for 5 minutes, and then the obtained complex was adsorbed on copper grids coated with ultrathin carbon film (Lacey carbon, Electron Microscopy China). After 1 minute of adsorption, the extra virus on the surface of the copper grids was removed with filter paper, quickly inserted into liquid ethane with the aid of the Vitrobot Mark IV (FEI), a freezing sample preparation machine, and then transferred to liquid nitrogen to preserve the samples. Data collection was done using a 200 kV *Arctica* (FEI) electron microscope equipped with a Gatan K2 direct electron detector. All the original electron microscope photos were drift-corrected by the MotionCor2 program. The contrast transfer function (CTF) correction was calculated by CTFFIND4, and the particles were automatically selected by EMAN2. Finally, the CV-A10/KRM1 complex structure at a resolution of 3.0 Å was obtained by Relion calculation. The final resolution was estimated from the Fourier shell correlation (FSC) curve. By simulating the neutral environment of extracellular pH 7.4 under physiological conditions, it is confirmed that KRM1 binds to CV-A10 virus through its Kringle (KR) and WSC domains, and the binding pattern was basically the same as that of KRM1 and DKK1 in the Wnt/β-catenin signaling pathway. As shown in FIG. 5, by comparing the binding pattern of KRM1 with DKK1 (PDB code: 5FWW), it is showed that CV-A10 could mimic DKK1 to inhibit the Wnt/β-catenin signaling pathway.

Example 6: CV-A10 Inhibits Wnt/β-Catenin Signaling Pathway

In this example, EV-A71 virus, as a control group, was purified by a method similar to the amplification and purification of CV-A10 in Example 1. The plasmid encoding full-length KRM1 was constructed with reference to the similar method of Example 4, that is, the amino acids 1-473 coding sequence (Genbank number: AAH63787) was ligated into the vector pLVX-DsRed-Monomer-N1 (Clontech) through 5'XhoI and 3'NotI restriction sites, and a Flag tag and stop codon was added at the 3' end. Cells were transfected to exogenously overexpress KRM1.

Figure 6:
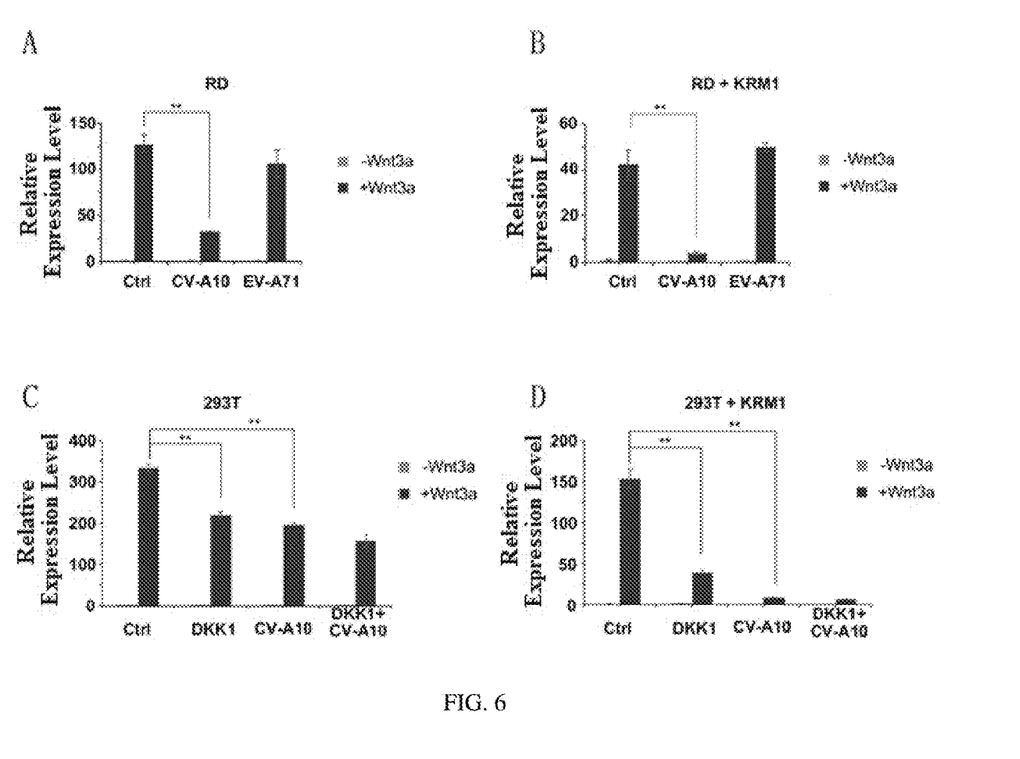
FIG. 6 shows the relative expression levels of reporter genes in virus-infected cells. CV-A10 inhibited the expression of downstream genes of Wnt/β-catenin signaling pathway in RD cells (A, B) and 293T cells (C, D), while the control EV-71 did not show a significant inhibitory effect, and DKK1 exhibited an inhibitory effect close to that of CV-A10.

The 293T or RD cells were cultured in a 24-well cell culture plate, and the reporter gene plasmid Top-Flash (Beyotime, D2501) and the internal reference control pRenilla-TK plasmid were transfected into the cells. One group of which was also added with the plasmid overexpressing full-length KRM1. The transfection system was as follows: 3 replicate wells in each group, 90 µl HBS solution, 70 µl PEI (0.1 mg/ml) and 2 µg plasmid. DMEM medium was changed 6 hours after transfection. After 12 hours of transfection, Wnt3a (R&D, 1324-WN-500/CF) was added to the culture medium, and cells were infected with CV-A10 or EV-A71 virus (MOI=1), respectively. After 24 hours of treatment, cells were lysed for luciferase activity detection. As shown in FIG. 6, CV-A10 had a significant inhibitory effect on the Wnt/β-catenin signaling pathway, and this effect was enhanced when KRM1 was overexpressed (FIGS. 6B and 6D), basically blocking the activation effect of Wnt3a on signaling. While the EV-A71 virus had no effect on the expression of the reporter gene (FIGS. 6A and 6B). Therefore, CV-A10 can act as a Wnt/β-catenin pathway inhibitor. In addition, when DKK1 protein (50 ng/ml, purchased from Beijing Sino Biological, Inc.) was added to the 293T group, both DKK1 and CV-A10 showed inhibitory effects on the Wnt/β-catenin signaling pathway, and the inhibitory effects were not multiplied upon simultaneous addition of DKK1 and CV-A10 (FIGS. 6C and 6D). The results confirmed again that CV-A10 inhibited the Wnt/β-catenin signaling pathway through the viral receptor KRM1. The binding epitope of CV-A10 to KRM1 was similar to that of DKK1, and these two competed for binding with KRM1.

Figure 7:
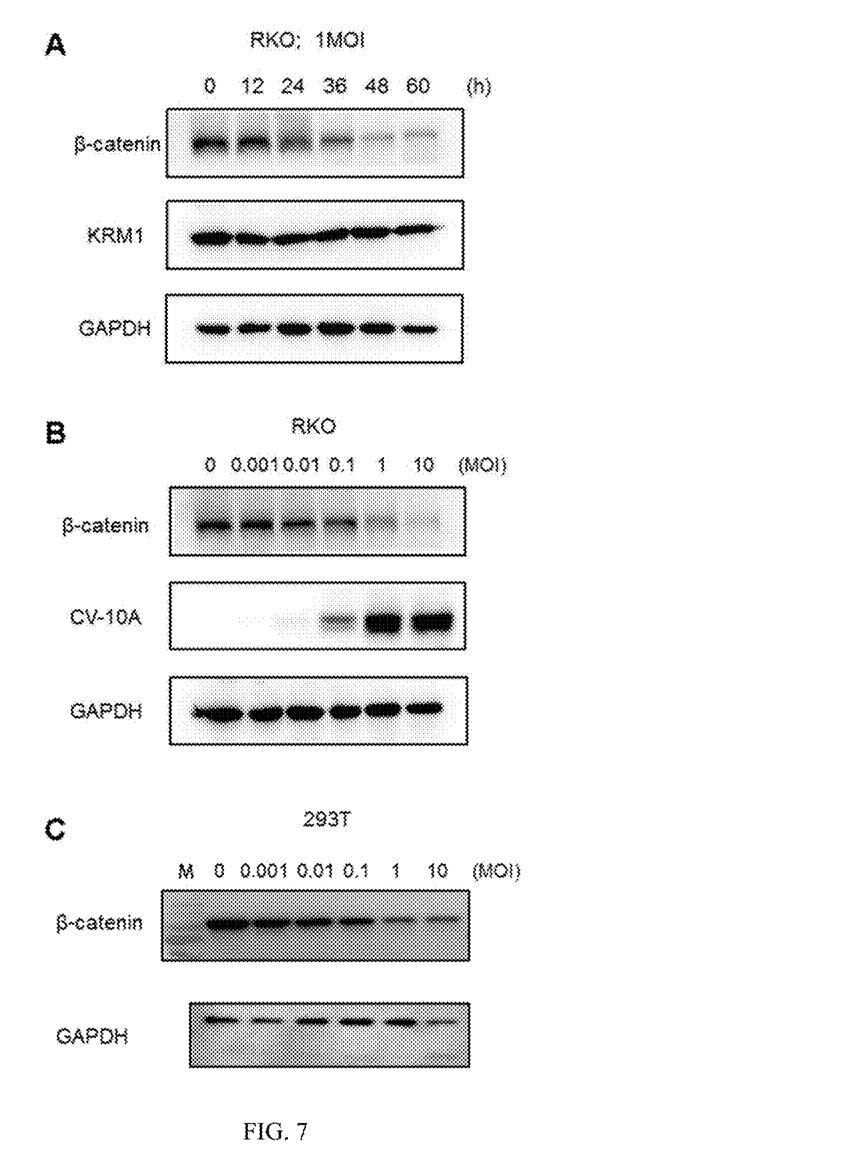
FIG. 7 shows that CV-A10 led to the degradation of β-catenin in RKO cells, and this effect was positively correlated with viral load and enhanced with increasing viral load.

Example 7: CV-A10 Leads to the Degradation of β-Catenin and Thereby Inhibits the Wnt/β-Catenin Pathway RKO colon cancer cells were cultured in 6-well plates at $1\times10^6$. After 12 h, when the cells confluence reached 90%, the cells were infected with CV-A10 (MOI=1) and viruses of different titers (MOI=0.001-10), and continued to culture at 37° C. RKO cells infected with CV-A10 (MOI=1) were washed twice with PBS at 36 h, and lysed with IP lysis buffer for Western blot detection. Cells infected with different titers of virus (MOI=0.001-10) were washed twice with PBS at 12 h, 24 h, 36 h, 48 h, 60 h, and 72 h, respectively, and lysed with 200 μl of IP lysis buffer for Western blot detection. As shown in FIG. 7, the expression of β-catenin in RKO cells decreased with the increase of infection time (FIG. 7A); under the same infection time, β-catenin decreased with the increase of the amount of virus added (FIG. 7B). This indicated that CV-A10 inhibited the Wnt/β-catenin pathway by degrading β-catenin. Similar results were obtained with 293T cells infected with CV-A10 (FIG. 7C).

Example 8: Tissue Expression Profile of KRM1, a Key Receptor of CV-A10 Invasion

Figure 8:
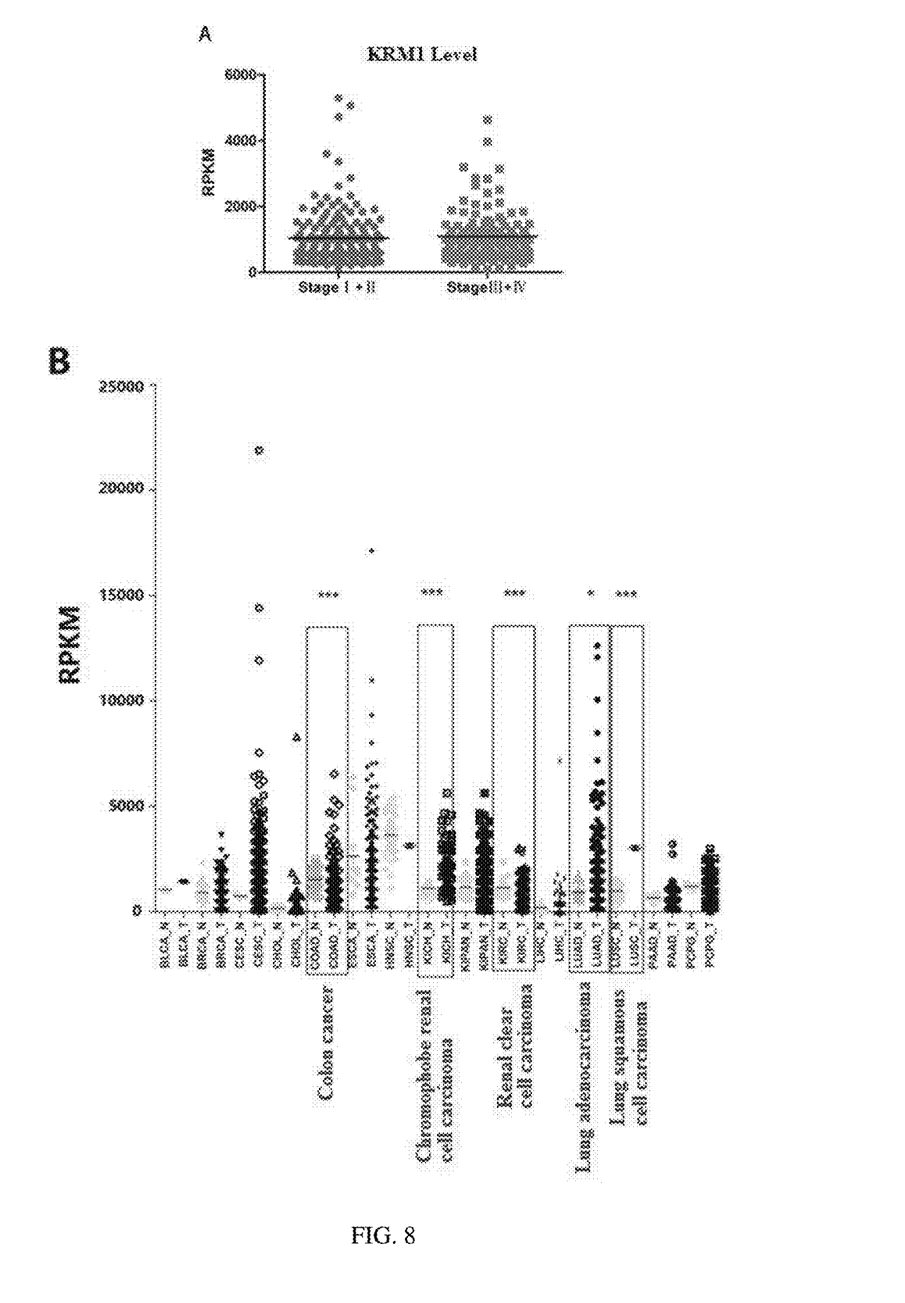
FIG. 8 shows the expression profiling of KRM1 in different stages of cancer (A) and different tumors (B).

Analysis with The Cancer Genome Atlas (TCGA) database found that there was no significant difference in the expression level of KRM1 at different stages of cancer (FIG. 8A). However, it is worth noting that the expression of KRM1 varied greatly in different tumors, and the expression was higher in some tumors such as chromophobe renal cell carcinoma (KICH), lung adenocarcinoma (LUAD), lung squamous cell carcinoma (LUSC) and renal clear cell carcinoma (KIRC), and especially in colon cancer, in which the expression level was significantly higher than that in normal tissues (FIG. 8B). This suggests that CV-A10 may have a more significant therapeutic effect on these tumors.

Figure 9:
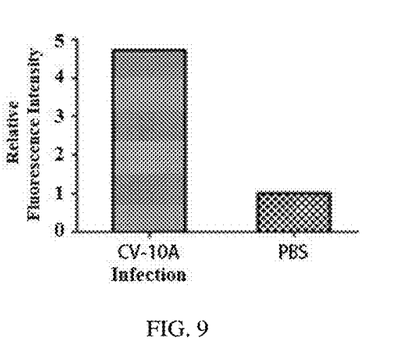
FIG. 9 shows increased KRM1 expression in RKO cells after CV-A10 infection.

It was further found by in vitro immunofluorescence experiments that the expression of KRM1 in RKO cells increased after infection with CV-A10 (FIG. 9). This result indicates that cells infected with CV-A10 cause the increase of KRM1 expression in cells, making the cells to be infected by more viruses, playing a positive feedback role.

Example 9: CV-A10 Reduces Survival of Lung Cancer Cells

Figure 10:
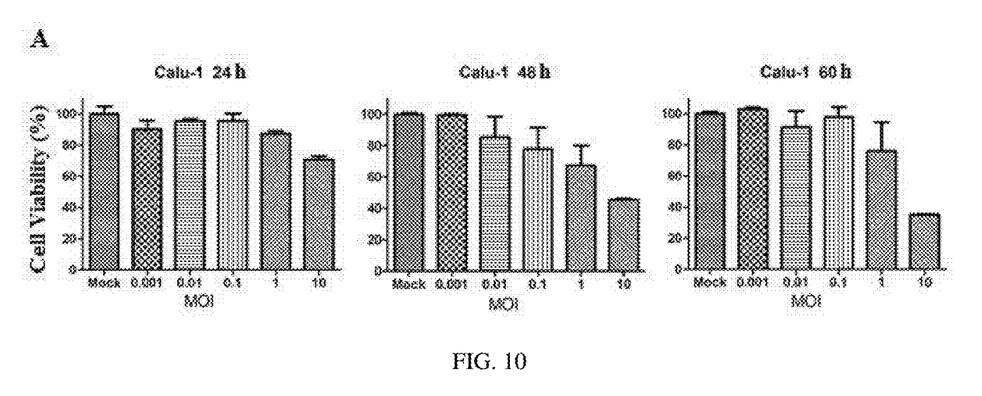
FIG. 10 shows that CV-A10 inhibited the growth of human lung cancer cell lines MRCS, PC3, Calu-1 and NCI-h1299, and the inhibitory effect was positively correlated with virus titer and gradually increased with time.

MRCS (ATCC, CCL-171), PC3 (ATCC, CRL-1435), Calu-1 (ATCC, HTB-54) and NCI-h1299 (ATCC, CRL-5083) lung cancer cell lines were cultured respectively, and $2\times10^4$ cells were plated in 96-well plates. After 8 h of culture, the medium was changed to serum-free DMEM medium, and cells were infected with virus of different titers (MOI=0.001-10) to continue the culture at 37° C. Cell viability was determined at various time points using the CellTiter-Glo™ Luminescent Cell Viability Assay assays kit (Promega). As shown in FIG. 10 (A-D), after 12 h, in the 4 lung cancer cells infected with high titers of virus (MOI=10), the cell viability began to decline, and almost all cells died at 48 h. Virus having a titer of MOI=1 also caused almost all cancer cells to die after 60 h. Viruses of other titers produced gradients of inhibitory effect at different times. The lowest titer (MOI=0.001) also showed inhibition of cell growth at 72 h. These results indicated that CV-A10 could lead to a decrease in the survival rate of lung cancer cells, and the effect was positively correlated with virus titer and infection time.

What is claimed is:

1. A method for treating a tumor comprising administering a therapeutic dose of an enterovirus using Kremen 1 (KRM1) as a receptor to a subject in need thereof,
   wherein the enterovirus is selected from the group consisting of coxsackievirus A2 (CV-A2), coxsackievirus A3 (CV-A3), coxsackievirus A4 (CV-A4), coxsackievirus A5 (CV-A5), coxsackievirus A6 (CV-A6), coxsackievirus A10 (CV-A10) and coxsackievirus A12 (CV-A12), and
   wherein the tumor is a KRM1-expressing tumor.

2. The method according to claim 1, wherein the enterovirus is engineered.

3. The method according to claim 2, wherein the genome of the engineered enterovirus further comprises a nucleotide sequence encoding an additional tumor therapeutic agent.

4. The method according to claim 1, wherein the enterovirus is administered to the subject by digestive tract route and/or by injection route.

5. The method according to claim 1, further comprising administering to the subject an additional anti-tumor therapy.

6. The method according to claim 5, wherein the additional anti-tumor therapy is selected from the group consisting of chemotherapy, radiotherapy, targeted therapy and immunotherapy.

7. The method according to claim 1, wherein the enterovirus is coxsackievirus A10 (CV-A10).

8. The method according to claim 1, wherein the tumor is selected from the group consisting of colon cancer, melanoma, prostate cancer, lung cancer, liver cancer, hepatocellular carcinoma, cervical cancer, uterine cancer, pancreatic cancer, gastric cancer, esophageal carcinoma, brain cancer, nail matrix cell cancer and breast cancer.

9. The method according to claim 1, wherein the tumor is colon cancer, melanoma, prostate cancer or lung cancer.

10. The method according to claim 4, wherein the enterovirus is administered to the subject by a route selected from the group consisting of oral administration, intratumoral injection, paracancerous injection, intramuscular injection and intravenous injection.

* * * * *